United States Patent
Koefod

(10) Patent No.: US 7,314,577 B2
(45) Date of Patent: Jan. 1, 2008

(54) DEICER COMPOSITIONS INCLUDING CORROSION INHIBITORS

(75) Inventor: Robert Scott Koefod, Maple Grove, MN (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

(21) Appl. No.: 11/041,000

(22) Filed: Jan. 21, 2005

(65) Prior Publication Data

US 2005/0230658 A1 Oct. 20, 2005

Related U.S. Application Data

(60) Provisional application No. 60/641,651, filed on Jan. 5, 2005, provisional application No. 60/580,434, filed on Jun. 17, 2004, provisional application No. 60/571,061, filed on May 14, 2004, provisional application No. 60/538,060, filed on Jan. 21, 2004.

(51) Int. Cl.
*C09K 3/18* (2006.01)
(52) U.S. Cl. .......................................... 252/70; 106/13
(58) Field of Classification Search ................. 106/13; 252/70
See application file for complete search history.

(56) References Cited

U.S. PATENT DOCUMENTS

| | | | | |
|---|---|---|---|---|
| 2,233,185 A | * | 2/1941 | Smith | 252/75 |
| 4,986,925 A | * | 1/1991 | Fiske | 252/70 |
| 5,350,533 A | * | 9/1994 | Hubred et al. | 252/70 |
| 5,366,650 A | | 11/1994 | Wiesenfeld et al. | |
| 5,435,930 A | * | 7/1995 | Chan et al. | 508/145 |
| 5,531,931 A | * | 7/1996 | Koefod | 252/387 |
| 5,842,330 A | * | 12/1998 | Richardson et al. | 56/6 |
| 6,149,833 A | * | 11/2000 | Dietl et al. | 252/70 |
| 6,596,189 B1 | * | 7/2003 | Moles et al. | 252/70 |
| 6,689,289 B1 | * | 2/2004 | Maes et al. | 252/76 |
| 6,861,009 B1 | * | 3/2005 | Leist | 252/70 |
| 6,872,327 B2 | * | 3/2005 | Dietl | 252/70 |

FOREIGN PATENT DOCUMENTS

| | | |
|---|---|---|
| CA | 2130649 | 2/1996 |
| DE | 156918 | 9/1982 |
| DE | 40 34 217 A1 | 5/1991 |
| EP | 000494506 A1 * | 7/1992 |
| FR | 1401440 | 6/1965 |
| RU | 2167180 C1 * | 9/2000 |

* cited by examiner

*Primary Examiner*—Anthony J. Green
(74) *Attorney, Agent, or Firm*—Merchant & Gould P.C.

(57) ABSTRACT

The present invention is directed to improved deicer compositions including corrosion inhibitors for deicing applications, in particular deicer compositions that will be exposed to, or come in contact with, galvanized metal. In an embodiment, the invention includes a deicing composition including an aqueous solution containing an alkali metal carboxylate salt. The deicing composition further includes at least one corrosion inhibitor.

30 Claims, No Drawings

DEICER COMPOSITIONS INCLUDING CORROSION INHIBITORS

REFERENCE TO PRIORITY APPLICATION

This application claims the benefit of Provisional Application Nos. 60/538,060, filed Jan. 21, 2004; 60/571,061, filed May 14, 2004; 60/580,434, filed Jun. 17, 2004; and 60/641,651, filed Jan. 5, 2005, which are incorporated by reference herein in their entirety.

FIELD OF THE INVENTION

The present invention is directed to improved deicer compositions including corrosion inhibitors for deicing applications, in particular deicer compositions that will be exposed to, or come in contact with, galvanized metal.

BACKGROUND OF THE INVENTION

Various deicing formulations have been created and are in use. Chloride based deicers are the most common and cost effective deicing chemicals. However chloride based deicers are particularly corrosive towards steel and other metals.

Some deicing formulations have been designed to reduce corrosiveness. However, the focus on reduced corrosiveness has been primarily on reducing corrosion towards mild steel, as this is a primary component of automobiles and bridge superstructure.

In areas that are particularly sensitive to corrosion, it is often desirable to use non-chloride deicers such as soluble salts of acetate and formate. However, even though acetate and formate salts are relatively non-corrosive towards steel, they are aggressively corrosive towards other metals. For instance, potassium acetate, a popular deicer for airport runways and for sensitive bridge decks, is highly corrosive towards galvanized steel. This creates a serious problem for some airports, which often have a large investment in runway lights with galvanized steel housings. Galvanized steel is also commonly used in highway superstructure, e.g. in galvanized guardrails.

Currently, in areas where galvanized steel must be protected, higher cost deicing chemicals, such as formulations containing a high percentage of propylene glycol, must be used. However, there are concerns with using high concentrations of propylene glycol due to its high cost and potential environmental effects. Thus, a need exists for lower cost deicing chemicals with reduced corrosiveness towards galvanized steel.

SUMMARY OF THE INVENTION

The present invention is directed to improved deicer compositions with corrosion inhibitors for deicing applications, in particular deicer compositions that will be exposed to, or come in contact with, galvanized metal. In an embodiment, the invention includes a deicing composition including an aqueous solution having a pH of between about 8 and about 12, and having between about 40% and about 75% by weight of an alkali metal carboxylate salt. The deicing composition further includes at least one corrosion inhibitor such as a polyvalent metal ion compound, a compound having an —SH group with a $pK_a$ in the range of 0.2 to 13, and/or a sulfide ion compound.

DETAILED DESCRIPTION OF THE INVENTION

The invention described herein includes a deicer composition, such as a liquid potassium acetate deicer, with corrosion inhibitors to reduce its corrosiveness, such as its corrosiveness toward galvanized steel.

As discussed above, a need exists for deicers that are minimally corrosive towards galvanized steel. For instance, many airports have large investments in runway lights having galvanized steel housings. Many northern airports, for example, protect their investment in galvanized steel runway lights by using propylene glycol as a deicer rather than liquid potassium acetate because propylene glycol is much less corrosive towards galvanized steel. However, propylene glycol is expensive and has the potential for environmental harm.

In various embodiments, the invention described herein provides methods and compositions to reduce or inhibit the corrosion of liquid potassium acetate towards galvanized steel and thereby provides a way of eliminating or at least reducing the amount of propylene glycol used in runway deicers. In some embodiments, the invention includes compositions without propylene glycol. In some embodiments, the invention includes an amount of propylene glycol less than that contained in standard propylene glycol based deicing compositions.

A corrosion inhibitor is added to the deicing composition. By way of example, corrosion inhibitors may include: a polyvalent metal ion compound; a compound having an acidic —SH group, or a salt thereof; sulfide ion; tolytriazole; sodium benzoate; or an alkali metal salt of metasilicate or silicate; or combinations thereof.

In some implementations, the composition comprises an aqueous solution having a pH of between about 8 and about 12, the solution containing between about 40 percent and about 75 percent by weight of an alkali metal carboxylate and an effective amount of a corrosion inhibitor. However, one of skill in the art will appreciate that the invention also encompasses solid deicer compositions.

Carboxylate Salts

Deicing compositions of the invention include an alkali metal, alkaline earth metal, or ammonium carboxylate salt. By way of example, compositions of the invention may include the ammonium, sodium, calcium, magnesium, and potassium salts of chloride, acetate, propionate, lactate, and formate. In some implementations the alkali metal carboxylate is potassium acetate. In other embodiments, the alkali metal carboxylate is potassium formate.

The amount of alkali metal carboxylate, such as potassium acetate, can be selected based upon the final properties desired for the composition, including its corrosion inhibition and deicing efficacy. In certain embodiments the amount of alkali metal carboxylate is approximately 50 percent of the composition by weight. In an embodiment the amount of alkali metal carboxylate is less than 60 percent or less than 70 percent by weight. Having too little alkali metal carboxylate may lead to insufficient deicing properties. In an embodiment, the amount of alkali metal carboxylate is greater than 20 percent by weight. The amount of alkali metal carboxylate may be greater than 30 percent by weight. In a particular embodiment, the amount of alkali metal carboxylate is greater than 40 percent.

Polyvalent Metal Ion Compounds

In some embodiments, the compositions of the invention include a source of soluble polyvalent metal ions, optionally with other corrosion inhibitors. By way of example, suitable polyvalent metal ions include but are not necessarily limited to the ions of lanthanum, cerium, neodymium, praseodymium, calcium, magnesium, manganese, chromium, and zinc.

The metal ion may be added as a water soluble salt of the metal ion (such as the nitrate, chloride, sulfate, acetate, or formate salt). Alternatively, the metal ion may be introduced by direct reaction of an alkaline metal salt (such as a hydroxide, oxide, or carbonate) with acetic or formic acid in the production of an acetate or formate containing deicer.

By way of example, the compositions of the invention may contain a lanthanide nitrate hydrate. The amount of lanthanide nitrate hydrate can be adjusted depending upon the desired properties of the deicer composition, including its corrosive properties. Suitable levels of lanthanide nitrate hydrate include from 1 percent to 3 percent by weight. In an embodiment, the amount by weight of lanthanide nitrate hexahydrate are greater than 0.25 percent (2500 ppm). In another embodiment, the amount by weight of lanthanide nitrate hexahydrate is greater than 0.5 percent (5000 ppm). In some embodiments, the amount by weight of lanthanide nitrate hexahydrate is greater than 1 percent. Using more lanthanide nitrate hydrate than necessary may be economically inefficient. In an embodiment, the amount of lanthanide nitrate hexahydrate is less than 10 percent by weight. The amount of lanthanide nitrate hexahydrate may also be less than 5 percent by weight or less than 3 percent by weight.

The lanthanide can be added as a soluble lanthanide salt, such as the chloride, nitrate, sulfate, or acetate of lanthanum, cerium, neodymium, or praseodymium. The lanthanide salt may be a single pure lanthanide salt such as cerium acetate hydrate. However, since the lanthanides are difficult to separate, it is relatively expensive to obtain pure lanthanide compounds. Therefore, alternatively, the lanthanide may be added as a water soluble mixed lanthanide salt compound. By way of example, the mixed lanthanide salt may include all of lanthanum, cerium, neodymium, or praseodymium. In an embodiment, the mixed lanthanide composition used to provide lanthanide ions in the final formulation of the invention contains less than 50 percent $La_2O_3$, less than 25 percent $CeO_2$, less than 15 percent $Pr_6O_{11}$, and less than 20 percent $Nd_2O_3$ (listed by weight on an oxide basis). Specific alternative embodiments include at least 10 percent $La_2O_3$, at least 0.1 percent $CeO_2$, at least 1.0 percent $Pr_6O_1$, and at least 1.0 percent $Nd_2O_3$ (listed by weight on an oxide basis). In certain embodiments the lanthanide salt compound contains 10-40 percent $La_2O_3$, 0.1 to 25 percent $CeO_2$, 1.0 to 15 percent $Pr_6O_{11}$, and 1.0 to 20 percent $Nd_2O_3$ (listed by weight on an oxide basis).

As another example of a polyvalent metal ion of the invention, magnesium ion compounds may be included in the composition of the invention. The magnesium ion may be added in the form of a variety of water soluble magnesium salts including magnesium acetate, chloride, nitrate, sulfate, and formate. In an embodiment, magnesium is added in the form of magnesium nitrate hexahydrate. In an embodiment, magnesium is added in the form of magnesium acetate tetrahydrate. In an embodiment, magnesium is added as a solution of magnesium acetate or a solution of magnesium nitrate. In example 6 below, both magnesium nitrate hexahydrate and magnesium acetate tetrahydrate are shown to be effective corrosion inhibitors.

Alternatively, the magnesium ion may be supplied by directly reacting an alkaline magnesium salt, such as magnesium oxide, magnesium hydroxide, or magnesium carbonate, directly with acetic acid, and then blending with the potassium acetate deicer.

Blends of a magnesium compound, such as magnesium acetate, and an alkali metal carboxylate salt, such as potassium acetate, over a broad range will produce an effective ice melting composition that shows reduced corrosiveness towards galvanized steel. Possible blends include from between 10% and 60% potassium acetate and between 0.5% and 35% magnesium acetate. Applicants have found that in certain embodiments replacing up to 10% potassium acetate with magnesium acetate does not detrimentally affect the ice melting capacity of the composition.

Other corrosion inhibitors disclosed herein may be combined with the polyvalent metal ion compound. By way of example, the compositions of the invention can include a magnesium compound and tolytriazole. An exemplary formula contains about 40-50% potassium acetate, 1.5% to 10.0% magnesium acetate tetrahydrate, and 0.05% to 0.20% tolyltriazole. In certain implementations the composition comprises an aqueous solution containing between 1.5% to 10.0% magnesium acetate tetrahydrate.

By way of further example, a compound containing an acidic —SH group can be combined with polyvalent metal ion compounds of the invention (as described below) to inhibit corrosion. In an embodiment, mercaptobenzothiazole or trimercaptotriazine is added as an acidic —SH group-containing compound. In an embodiment, a salt of a compound containing an acidic —SH group can be combined with the magnesium compounds to inhibit corrosion. In an embodiment, potassium O-ethylxanthate is added. The amount of the acidic —SH group compound, or salt thereof, may be from about 0.1% by weight to about 5.0% by weight. In an embodiment, the amount is from about 0.2% to 1.0%.

Compounds Containing an Acidic —SH Group

Deicing compositions of the invention may also include a compound having an acidic —SH group, or a salt thereof. In an embodiment, the invention may include a compound having an —SH group with a $pK_a$ in the range of 0.2 to 13. For example, the composition of the invention may include potassium acetate, tolytriazole, a lanthanide nitrate, and trimercaptotriazine and/or 2-mercaptobenzothiazole. The trisodium salt of trimercaptotriazine (also called "TMT", "trithiocyanuric acid", or "1,3,5-triazine-2,4,6-(1H,3H,5H)-trithione") is a useful low toxicity corrosion inhibitor for use in deicer compositions. Another useful corrosion inhibitor is 2-mercaptobenzothiazole (also called "2-MBT").

Other suitable compounds may include but are not limited to 2-mercaptothiazoline, 2-mercaptopyridine, 2-mercaptopyrimidine, 5-mercapto-1-tetrazoleacetic acid, 2-mercaptobenzimidazole, thiolactic acid, 6-mercaptopurine; 1H-1,2,4-triazole-3-thiol, 2-mercaptobenzothiazole, mercaptobenzimidazole, trimercaptotriazine, O-ethylxanthic acid, dimethyldithiocarbamic acid, diethyldithiocarbamic acid, trithiocarbonic acid, and hydropolysulide,carbonylthioylbis-,disodium salt (Thio-Red).

These inhibitors are effective in reducing the corrosiveness of other deicers towards galvanized steel, including the sodium, calcium, magnesium, ammonium, and potassium salts of chloride, acetate, propionate, and formate. The amount of trimercaptotriazine and 2-mercaptobenzothiazole included in the deicing composition can be varied so as to adjust the corrosion inhibition properties of the deicer composition.

Trimercaptotriazine can be the sole corrosion inhibitor, 2-mercaptobenzothiazole can be the sole corrosion inhibitor, or a mixture of these two corrosion inhibitors can be used together. It is also possible to use acidic —SH group containing inhibitors along with other inhibitors discussed herein. By way of example, compounds containing acidic —SH groups can be effectively combined with polyvalent metal ion salts as demonstrated in example 10 below.

In some embodiments, the total combined amount of trimercaptotriazine and 2-mercaptobenzothiazole is less than 5 percent by weight, less than 3 percent by weight, or less than 1 percent by weight of the deicer composition. In some embodiments, the amount of trimercaptotriazine and 2-mercaptobenzothiazole (individually or in combination) is at least 0.05 percent by weight, at least 0.10 percent by weight, or at least 0.15 percent by weight of the deicer composition. In an embodiment, the amount of trimercaptotriazine and 2-mercaptobenzothiazole (individually or in combination) is from 0.05 percent to 0.75 percent by weight of the composition.

In one implementation, the composition includes approximately 50 percent potassium acetate, 0.15 percent-0.75 percent tolyltriazole, 1.0 percent-3.0 percent lanthanide nitrate hexahydrate, 0.10-0.75 percent trisodium salt of trimercaptotriazine, and water. The trisodium salt of trimercaptotriazine is also known as the trisodium salt of trithiocyanuric acid. The use of the acid and the salts of the acid are both within the scope of embodiments of the invention. In another embodiment, the composition includes approximately 50 percent potassium acetate, 0.15 percent-0.75 percent tolyltriazole, 1.0 percent-3.0 percent lanthanide nitrate hexahydrate, 0.10-0.75 percent 2-mercaptobenzothiazole, and water.

Sulfide Ion Compounds

In an embodiment, compositions of the invention may include compounds that result in a concentration of sulfide ions. By way of example, compositions of the invention may include sodium sulfide nonahydrate, which in an aqueous solution results in the presence of sulfide ion. Embodiments of the invention may include a sulfide ion compound by itself as a corrosion inhibitor, or a sulfide ion compound in combination with other corrosion inhibitors disclosed herein.

The sulfide ion compound may be present in a concentration of at least 10 ppm of a sulfide ion compound. In an embodiment, the composition of the invention contains less than 5000 ppm of a sulfide ion compound. In an embodiment, the composition of the invention may include from 10 ppm to 5000 ppm of a sulfide ion compound. In an embodiment, the composition may contain at least 50 ppm of a sulfide ion compound. In an embodiment, the composition may contain at least 0.1 percent by weight of a sulfide ion compound. In an embodiment, the composition may contain at least 0.01 percent by weight of a sulfide ion compound.

Tolytriazole

The compositions may contain tolytriazole (or tolyltriazole) in some embodiments as an additional corrosion inhibitor. Tolyltriazole is effective in inhibiting the corrosion of potassium acetate towards certain aircraft alloys and may be desirable as an additional inhibitor when used for airport applications. The amount of tolytriazole can be adjusted depending upon the final desired properties of the deicer composition, including its corrosive properties. In certain embodiments greater than 0.15 percent by weight (or 1500 ppm) of tolytriazole is contained within the composition. In some embodiments, greater than 0.30 percent by weight (or 3000 ppm) of tolytriazole is contained within the composition. In an embodiment, the composition contains approximately 0.50 percent by weight (or 5000 ppm) of tolytriazole. In embodiments, the amount of tolytriazole is less than 2 percent by weight. In some embodiments, the amount of tolytriazole is less than 1 percent of the deicer composition.

In some implementations the deicer comprises approximately 50 percent by weight potassium acetate, at least 0.05 percent by weight tolyltriazole, and 1.0 percent-3.0 percent by weight lanthanide nitrate hexahydrate. This same composition can also be produced with less tolyltriazole, such as 0.03 percent or more tolyltriazole, alternatively 0.05 percent or more tolyltriazole.

Other Compounds:

Further ingredients of the composition of the invention can include, for example, sodium benzoate, sodium gluconate, or an alkali metal salt of metasilicate or silicate. In some embodiments these ingredients are provided in the following concentrations: at least 0.1 percent sodium benzoate; at least 0.1 percent sodium gluconate; and/or at least 50 ppm alkali metal salt of metasilicate or silicate. In certain embodiments the ingredients include up to 5.0 percent sodium benzoate; up to 5.0 percent sodium gluconate; and/or up to 5000 ppm alkali metal salt of metasilicate or silicate. In other embodiments the maximum amount of metasilicate is up to 5 percent. In some embodiments these ingredients are provided in the following concentrations: 0.1 percent to 5.0 percent sodium benzoate; 0.1 percent to 5.0 percent sodium gluconate; and/or 50 ppm to 5000 ppm alkali metal salt of metasilicate or silicate.

The present invention may be better understood with reference to the following examples. These examples are intended to be representative of specific embodiments of the invention, and are not intended as limiting the scope of the invention.

EXAMPLES

Various formulations of alkali metal carboxylate salt liquids were tested for corrosiveness towards galvanized steel. The following test method was used: Hot dip galvanized 1010 steel washers (1.25 inch outer diameter, 0.5 inch inner diameter 0.0625 inch thick) were obtained from Metal Samples Corrosion Monitoring Systems, Munford, Ala. A 500 mL Erlenmeyer flask equipped with a rubber stopper containing a small hole large enough to allow a thread to pass through was filled with approximately 322 mL (for immersion of one coupon) or 644 mL (for immersion of two coupons) of a test solution. The test solutions were made by diluting 200 mL of the liquid potassium acetate formulation to 1000.0 mL with de-ionized water in a volumetric flask. The galvanized washers were pre-weighed to the nearest 0.1 mg and then suspended within the flask just above the surface of the solution by a piece of monofilament that was threaded through the rubber stopper sealing the flask. Thus the test washers were sealed within the flasks of test solution and were in contact with the solutions' vapor phase.

The suspended washers were connected to a device that lowered them into the test solution for 10 minutes and then lifted them back out for 50 minutes. This cycle was continued repeatedly for 168 hours. At the end of the exposure period, the washers were removed from the test apparatus and were vigorously scrubbed under warm water with a soft brush to remove all of the corrosion products.

Next, the washers were immersed for 5 seconds in a bath of 3-4 percent hydrochloric acid to dissolve any adherent corrosion products. The cleaned washers were then rinsed in water and then in acetone, allowed to air dry, and were weighed. Cleaning control washers that had not been exposed to deicer solutions were similarly cleaned and the amount of weight loss due to cleaning alone was subtracted from the measured weight loss of the test washers. The corrosion rate in units of mils per year (mpy) was calculated from the measured corrosion weight loss of the washers. As a comparative, potassium acetate, without a corrosion inhibitor, frequently demonstrates a corrosion rate of about 25 mpy.

Example 1

Corrosion Rates of Galvanized Steel in Potassium Acetate Solution Inhibited by Sodium Benzoate, Cerium Acetate Hydrate, Sodium Gluconate, and/or Tolytriazole Results of a set of corrosion screening tests are given in Table 1. Each formulation in Table 1 was then diluted as described above for the corrosion test. The of the formula in each case is water.

TABLE 1

| Solution | Potassium Acetate | Sodium Benzoate | Cerium Acetate Hydrate | Sodium Gluconate | Tolytriazole (ppm) | Corrosion Rate (mpy) |
|---|---|---|---|---|---|---|
| (control) | 50.0 | 0.0 | 0.0 | 0.0 | 0 | 27 |
| 1 | 47.5 | 4.8 | 0.0 | 0.0 | 500 | 12 |
| 2 | 48.7 | 2.4 | 0.0 | 0.0 | 500 | 20 |
| 3 | 49.4 | 1.2 | 0.0 | 0.0 | 500 | 24 |
| 4 | 47.6 | 0.0 | 4.8 | 0.0 | 500 | 0.7 |
| 5 | 48.8 | 0.0 | 2.4 | 0.0 | 500 | 0.5 |
| 6 | 49.4 | 0.0 | 1.2 | 0.0 | 500 | 0.6 |
| 7 | 47.6 | 0.0 | 0.0 | 4.8 | 500 | 5 |
| 8 | 48.8 | 0.0 | 0.0 | 2.4 | 500 | 8 |
| 9 | 49.4 | 0.0 | 0.0 | 1.2 | 500 | 11 |

The results shown in Table 1 demonstrate that sodium benzoate inhibits the corrosion of potassium acetate towards galvanized steel by as much as 56 percent in comparison to the control. Sodium gluconate was an even more effective inhibitor, decreasing the corrosion rate by as much as 81 percent in comparison to the control. However, the most effective inhibitor in this set of experiments was cerium acetate which decreased the corrosion rate by about 98 percent in comparison to the control. The effectiveness of cerium acetate suggested that other lanthanide salts are also effective.

The formulas in Table 1 also contained tolyltriazole as an optional additional corrosion inhibitor. Tolyltriazole is effective in inhibiting the corrosion of potassium acetate towards certain aircraft alloys and may be desirable as an additional inhibitor when used for airport applications.

Example 2

Corrosion Rates of Galvanized Steel in Potassium Acetate Solution Inhibited by Cerium Acetate Hydrate, Mixed Lanthanum, Lanthanide Chloride Hexahydrate, Sodium Sulfide Nonahydrate, and/or Potassium Acetate Saturated with Sodium Metasilicate The results of another series of screening tests are given in Table 2. In Table 2, "La,Ln chloride hexahydrate" refers to a mixed lanthanum, lanthanide chloride hexahydrate consisting of the following lanthanide composition (given on an oxide basis): 17.9 percent $La_2O_3$, 3.6 percent $CeO_2$, 2.1 percent $Pr_6O_{11}$, and 5.4 percent $Nd_2O_3$. Again, the compositions described below were diluted to make a 20 percent by volume solution for the corrosion test.

TABLE 2

| Solution | Potassium Acetate | Cerium Acetate Hydrate | La, Ln Chloride Hexahydrate | Sodium Sulfide Nonahydrate | Potassium Acetate Saturated w/ Sodium Metasilicate | Corrosion Rate (mpy) |
|---|---|---|---|---|---|---|
| Control | 50.0 | 1.0 | 0.0 | 0.0 | 0.0 | 32 |
| 1 | 49.5 | 0.5 | 0.0 | 0.0 | 0.0 | 7 |
| 2 | 49.7 | 0.25 | 0.0 | 0.0 | 0.0 | 13 |
| 3 | 49.9 | 0.0 | 1.0 | 0.0 | 0.0 | 21 |
| 4 | 49.2 | 0.0 | 0.5 | 0.0 | 0.0 | 0.4 |
| 5 | 49.6 | 0.0 | 0.25 | 0.0 | 0.0 | 13 |
| 6 | 49.8 | 0.0 | 0.0 | 2.7 | 0.0 | 16 |
| 7 | * | 0.0 | 0.0 | 0.0 | 50.0* | 8 |

* This composition contained approximately 50 percent potassium acetate and was saturated with sodium metasilicate, with the precise amount of sodium metasilicate not determined.

The results in Table 2 show further evidence of the effectiveness of cerium acetate inhibiting the corrosion of galvanized steel in potassium acetate and confirms that the lower cost mixed lanthanide compound was also effective. In addition to the strong effectiveness of the mixed lanthanide compound, the tests in Table 2 also indicated that sodium sulfide and sodium metasilicate ($Na_2SiO_3$) are also effective inhibitors of galvanized steel corrosion in potassium acetate solution.

Example 3

Corrosion Rates of Galvanized Steel in Potassium Acetate Solution Inhibited by Sodium Sulfide Nonahydrate, and/or Mixed Lanthanum, Lanthanide Chloride Hexahydrate Another series of tests was run to determine the effectiveness of different levels of sulfide in a potassium acetate solution. Results of this series of experiments are given in Table 3.

TABLE 3

| Solution | Formula | | | Corrosion Rate (mpy) |
|---|---|---|---|---|
| | Potassium Acetate | Sodium Sulfide Nonahydrate | La, Ln Chloride Hexahydrate | |
| 1 | 49.0 | 2.0 | 0.0 | 1 |
| 2 | 49.5 | 1.0 | 0.0 | 2 |
| 3 | 49.8 | 0.5 | 0.0 | 1 |
| 4 | 49.9 | 0.25 | 0.0 | 2 |
| 5 | 49.6 | 0.0 | 0.75 | 7 |
| 6 | 49.5 | 0.0 | 1.0 | 6 |

The data in Table 3 indicate that sodium sulfide nonahydrate reduced the corrosiveness of an approximately 50 percent potassium acetate solution to 1-2 mils per year at sodium sulfide nonahydrate levels as low as 0.25 percent and suggests that it would be effective at even lower levels. Replicates of the lanthanum lanthanide chloride formulas were run which re-confirmed that it is as effective as the pure cerium compound.

Example 4

Corrosion Rates of Galvanized Steel in Inhibited Potassium Acetate Solution with Inhibited by Mixed Lanthanum, Lanthanide Nitrate Hexahydrate, Sodium Sulfide Nonahydrate, and/or Tolytriazole For a variety of deicer applications, chlorides are often undesirable due to their corrosive effects on aircraft alloys and other metals. Therefore, a series of experiments was run to see if the mixed lanthanum lanthanide nitrate salt was as effective a corrosion inhibitor as the chloride salt initially tested. Results of these tests are given in Table 4. In Table 4 "La,Ln nitrate hexahydrate" refers to a mixed lanthanum, lanthanide nitrate hexahydrate consisting of the following lanthanide composition (given on an oxide basis): 14.9 percent $La_2O_3$, 4.2 percent $CeO_2$, 2.1 percent $Pr_6O_{11}$, and 4.7 percent $Nd_2O_3$.

TABLE 4

| Solution | Formula | | | | Corrosion Rate (mpy) |
|---|---|---|---|---|---|
| | Potassium Acetate | La, Ln Nitrate Hexahydrate | Sodium Sulfide Nonahydrate | Tolytriazole (ppm) | |
| 1 | 50.0 | 0.75 | 0.0 | 1500 | 10 |
| 2 | 50.0 | 1.0 | 0.0 | 1500 | 2 |
| 3 | 50.0 | 1.5 | 0.0 | 1500 | 2 |
| 4 | 50.0 | 0.0 | 0.19 | 1500 | 1 |
| 5 | 50.0 | 0.0 | 0.10 | 1500 | 9 |

The data in Table 4 demonstrate the effectiveness of various levels of the mixed lanthanum lanthanide nitrate salt as well as re-confirming the effectiveness of some lower levels of sodium sulfide nonahydrate.

Example 5

Corrosion Rates of Galvanized Steel in Inhibited Potassium Acetate Solution Inhibited by Mixed Lanthanum, Lanthanide Chloride Hexahydrate, Tolytriazole, Tolytriazole Saturated with Sodium Metasilicate, Sodium Benzoate, and/or Sodium Sulfide Nonahydrate It is often possible to get improved corrosion inhibition by using two different corrosion inhibitors in combination. Table 5 shows data on some mixed corrosion inhibitors in potassium acetate solution.

TABLE 5

| Solution | Formula | | | | | | Corrosion Rate (mpy) |
|---|---|---|---|---|---|---|---|
| | Potassium Acetate | La, Ln Chloride Hexahydrate | Tolytriazole (ppm) | Tolytriazole saturated with Sodium Metasilicate (ppm) | Sodium Benzoate | Sodium Sulfide Nonahydrate | |
| 1 | 50.0 | 1.0 | 500 | 0 | 0.0 | 0.0 | 3 |
| 2 | 50.0 | 1.0 | 0 | 1500 | 0.0 | 0.0 | 2 |
| 3 | 50.0 | 1.0 | 1500 | 0 | 0.33 | 0.0 | 2 |
| 4 | 50.0 | 1.0 | 1500 | 0 | 0.0 | 40 ppm | 2 |

The data in Table 5 suggest that addition of small amounts of sodium metasilicate, sodium benzoate, and/or sodium sulfide will provide some further increase in the corrosion inhibition arising from lanthanide salts in potassium acetate solution.

Example 6

Corrosion Rates of Galvanized Steel in Potassium Acetate Solution Inhibited by Magnesium Compounds The corrosion inhibiting activity of magnesium compounds was tested at various concentrations, as shown below in Table 6, was tested with corrosion on galvanized steel caused by potassium acetate.

TABLE 6

| Solution | Formula | | | Corrosion Rate (mpy) |
|---|---|---|---|---|
| | Potassium Acetate | Magnesium Nitrate Hexahydrate | Magnesium Acetate Tetrahydrate | |
| Control | 50.0 | 0.0 | 0.0 | 25.9 |
| 1 | 50.0 | 1.0 | 0.0 | 2.4 |
| 2 | 50.0 | 2.0 | 0.0 | 1.3 |
| 3 | 50.0 | 3.0 | 0.0 | 0.8 |
| 4 | 50.0 | 4.0 | 0.0 | 0.6 |
| 5 | 50.0 | 0.0 | 3.3 | 1.3 |
| 6 | 50.0 | 0.0 | 6.6 | 0.5 |
| 7 | 45.0 | 0.0 | 10.0 | 0.5 |

This example shows that corrosion of galvanized steel caused by a carboxylate salt, such as potassium acetate, can be effectively inhibited by a magnesium compound, such as magnesium nitrate hexahydrate or magnesium acetate hexahydrate.

Example 7

Corrosion Rates of Galvanized Steel in Potassium Formate Solution Inhibited by Magnesium Nitrate Hexahydrate The corrosion inhibiting effect of magnesium nitrate hexahydrate was tested with a carboxylate salt other than potassium acetate. For example, in accordance with the amounts shown below in Table 7, the corrosion inhibiting effect of magnesium nitrate hexahydrate was tested with potassium formate on galvanized steel.

TABLE 7

| Solution | Formula | | Corrosion Rate (mpy) |
|---|---|---|---|
| | Potassium Formate | Magnesium Nitrate Hexahydrate | |
| 1 | 50.0 | 0.0 | 27.2 |
| 2 | 50.0 | 3.0 | 0.6 |

This example shows that corrosion inhibitors of the invention, such as magnesium nitrate hexahydrate, are effective inhibitors of corrosion when used in conjunction with many different carboxylate salts, such as potassium formate.

Example 8

Corrosion Rates of Galvanized Steel in Potassium Acetate Solution Inhibited by Magnesium Nitrate Hexahydrate and Boosted by Compounds Containing an Acidic —SH Group In accordance with the amounts shown below in Table 8, the corrosion rate of galvanized steel in potassium acetate solution inhibited by magnesium nitrate hexahydrate was compared with the corrosion rate for potassium acetate solution inhibited by magnesium nitrate hexahydrate in addition to compounds containing an acidic —SH group, such as mercaptobenzothiazole and trimercaptotriazine.

TABLE 8

| Solution | Formula | | | | Corrosion Rate (mpy) |
|---|---|---|---|---|---|
| | Potassium Acetate | Magnesium Nitrate Hexahydrate | Potassium O-ethylxanthate | Trimercaptotriazine | |
| 1 | 50.0 | 1.5 | 0.0 | 0.0 | 2.4 |
| 2 | 50.0 | 1.5 | 1.0 | 0.0 | 0.7 |
| 3 | 50.0 | 1.5 | 0.0 | 0.5 | 0.6 |

This example shows that the corrosion inhibiting activity of magnesium nitrate hexahydrate can be enhanced by compounds containing an acidic —SH group, such as mercaptobenzothiazole and trimercaptotriazine.

Example 9

Corrosion Inhibition with Various Polyvalent Metal Ions

Various polyvalent metal ion salts were tested for their ability to inhibit corrosion of galvanized steel caused by potassium acetate. Specifically, magnesium nitrate hexahydrate ($Mg(NO_3)_2.6H_2O$), zinc nitrate hexahydrate ($Zn(NO_3)_2.6H_2O$), a mixed salt of lanthanum, cerium, praseodymium, and neodymium nitrates ($Ln(NO_3)_3.6H_2O$) (as described above), manganese nitrate monohydrate ($Mn(NO_3)_3.H_2O$), and calcium nitrate tetrahydrate ($Ca(NO_3)_2.4H_2O$), in the concentrations shown below in Table 9, were tested in accordance with the procedures above for their ability to inhibit corrosion caused by potassium acetate.

TABLE 9

| Solution | Potassium Acetate | $Mg(NO_3)_2$ $(H_2O)_6$ | $Zn(NO_3)_2$ $(H_2O)_6$ | $Ln(NO_3)_3$ $(H_2O)_6$* | $Mn(NO_3)_3$ $(H_2O)$ | $Ca(NO_3)_2$ $(H_2O)_4$ | Corrosion Rate (mpy) |
|---|---|---|---|---|---|---|---|
| Control | 50.0 | 0.0 | 0.0 | 0.0 | 0.0 | 0.0 | 25.9 |
| 1 | 50.0 | 1.75 | 0.0 | 0.0 | 0.0 | 0.0 | 2.4 |
| 2 | 50.0 | 0.0 | 3.0 | 0.0 | 0.0 | 0.0 | 12.3 |
| 3 | 50.0 | 0.0 | 0.0 | 1.5 | 0.0 | 0.0 | 2.2 |
| 4 | 50.0 | 0.0 | 0.0 | 0.0 | 5.0 | 0.0 | 7.3 |
| 5 | 50.0 | 0.0 | 0.0 | 0.0 | 0.0 | 3.0 | 18.0 |

This example shows that many different polyvalent metal ion salts can be effective to reduce the rate of corrosion of galvanized metal caused by an alkali metal carboxylate salt. This example also shows that magnesium ion salts and mixed lanthanide metal ion salts are particularly effective for preventing corrosion of galvanized metal caused by an alkali metal carboxylate salt, such as potassium acetate.

Example 10

Corrosion Inhibition of Polyvalent Metal Ions as Boosted by Various Compounds Containing an Acidic —SH Group Various compounds containing an acidic —SH group were tested for their ability to enhance the corrosion inhibition of polyvalent metal ion salts. Specifically, potassium O-ethylxanthate (A), 2-mercaptothiazoline (B), 2-mercaptopyridine (C), 2-mercaptopyrimidine (D), 5-mercapto-1-tetrazoleacetic acid (E), and 2-mercaptobenzimidazole (F) were tested for their ability to enhance the corrosion inhibition of polyvalent metal ion salts such as magnesium nitrate hexahydrate ($Mg(NO_3)_2.6H_2O$), and a mixed salt of lanthanum, cerium, praseodymium, and dymium nitrates ($Ln(NO_3)_3.6H_2O$ (as described above). The concentrations tested as shown in Table 10 below.

TABLE 10

| Solution | Potassium Acetate | $Mg(NO_3)_2$ $(H_2O)_6$ | $Ln(NO_3)_3$ $(H_2O)_6$ | A | B | C | D | E | F | Corrosion Rate (mpy) |
|---|---|---|---|---|---|---|---|---|---|---|
| Control 1 | 50.0 | 1.75 | 0.0 | 0.0 | 0.0 | 0.0 | 0.0 | 0.0 | 0.0 | 2.4 |
| 1 | 50.0 | 1.75 | 0.0 | 1.0 | 0.0 | 0.0 | 0.0 | 0.0 | 0.0 | 0.7 |
| Control 2 | 50.0 | 0.0 | 1.5 | 0.0 | 0.0 | 0.0 | 0.0 | 0.0 | 0.0 | 2.2 |
| 2 | 50.0 | 0.0 | 1.5 | 0.0 | 0.5 | 0.0 | 0.0 | 0.0 | 0.0 | 0.4 |
| 3 | 50.0 | 0.0 | 1.5 | 0.0 | 0.0 | 0.5 | 0.0 | 0.0 | 0.0 | 0.5 |
| 4 | 50.0 | 0.0 | 1.5 | 0.0 | 0.0 | 0.0 | 0.5 | 0.0 | 0.0 | 1.4 |
| 5 | 50.0 | 0.0 | 1.5 | 0.0 | 0.0 | 0.0 | 0.0 | 0.5 | 0.0 | 1.6 |
| 6 | 50.0 | 0.0 | 1.5 | 0.0 | 0.0 | 0.0 | 0.0 | 0.0 | 0.5 | 1.2 |

This example shows that compounds containing an acidic —SH group can boost, or further enhance, the corrosion preventative effect of polyvalent metal ion salts on corrosion caused by alkali metal carboxylate salts, such as potassium acetate.

It should be noted that, as used in this specification and the appended claims, the singular forms "a," "an," and "the" include plural referents unless the content clearly dicrtates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

I claim:

1. A deicing composition comprising:
   a carboxylate salt selected from the group consisting of formate, propionate, acetate and lactate; and
   at least one corrosion inhibitor comprising a lanthanide ion compound.

2. The composition of claim 1, wherein the at least one corrosion inhibitor comprises a trivalent lanthanide.

3. The composition of claim 1, wherein the lanthanide ion compound comprises lanthanum acetate hydrate.

4. The composition of claim 1, wherein the lanthanide ion compound comprises cerium acetate hydrate.

5. The composition of claim 1, wherein the lanthanide ion compound comprises a mixed lanthanide salt.

6. The composition of claim 5, comprising from 0.25% to 10.0% by weight of a mixed lanthanide salt.

7. The composition of claim 5, the mixed lanthanide salt comprising salts of La, Ce, Pr, and Nd.

8. The composition of claim 6, wherein the lanthanide ion is added as a water soluble mixed lanthanide salt compound containing on an oxide basis 10-40% by weight $La_2O_3$, 0.1 to 25% by weight $CeO_2$, 1.0 to 15% by weight $Pr_6O_{11}$, and 1.0 to 20% by weight $Nd_2O_3$.

9. The composition of claim 1, wherein the carboxylate salt comprises potassium acetate.

10. The composition of claim 1, wherein the carboxylate salt comprises potassium formate.

11. The composition of claim 1 further comprising 50 ppm to 5 percent by weight alkali metal salt of metasilicate or silicate.

12. A method of deicing a surface, the method comprising applying the deicing composition of claim 1 to a surface.

13. The method of deicing a surface of claim 12, wherein applying the deicing composition to a surface comprises applying the composition to an airport runway.

14. A deicing composition comprising:
a carboxylate salt selected from the group consisting of formate, propionate, acetate and lactate; and
at least one corrosion inhibitor comprising a polyvalent metal ion compound selected from the group consisting of magnesium ion compound, and a combination of the magnesium ion compound and a lanthanide ion compound;
wherein the magnesium ion compound is selected from the group consisting of magnesium nitrate hexahydrate, magnesium acetate tetrahydrate, and combinations thereof.

15. The composition of claim 14, comprising from 0.5% to 10.0% of a magnesium ion compound.

16. The composition of claim 14, wherein the magnesium ion compound present in sufficient quantity to provide from 0.05% to 3.0% soluble Mg(II).

17. A deicing composition comprising:
a carboxylate salt selected from the group consisting of formate, propionate, acetate and lactate; and
at least one corrosion inhibitor comprising (a) a polyvalent metal ion compound and (b) a compound having an —SH group with a $pK_a$ in the range of 0.2 to 13, wherein the compound having an —SH group with a $pK_a$ in the range of 0.2 to 13 is selected from the group consisting of potassium O-ethylxanthate, 2-mercaptothiazoline, 2-mercaptopyridine, 2-mercaptopyrimidine, 5-mercapto-1-tetrazoleacetic acid, and 2-mercaptobenzimidazole.

18. A deicing composition comprising:
a carboxylate salt selected from the group consisting of formate, propionate, acetate and lactate; and
at least one corrosion inhibitor comprising (a) a polyvalent metal ion compound and (b) a compound having an —SH group with a $pK_a$ in the range of 0.2 to 13, wherein the compound having an —SH group with a $PK_a$ in the range of 0.2 to 13 is selected from the group consisting of potassium O-ethyixanthate, 2-mercaptothiazoline, and 2-mercaptopyridine.

19. A deicing composition comprising:
a carboxylate salt selected from the group consisting of formate, propionate, acetate and lactate; and
at least one corrosion inhibitor comprising a sulfide ion compound originating as a composition consisting of sodium sulfide nonahydrate, sodium sulfide anhydrous salt, or an aqueous solution of a sulfide salt, and combinations thereof.

20. The composition of claim 19, comprising from 10 ppm to 5,000 ppm of the sulfide ion compound.

21. A deicing composition comprising:
a carboxylate salt selected from the group consisting of formate, propionate, acetate and lactate;
at least one corrosion inhibitor selected from the group consisting of: a polyvalent metal ion compound selected from the group consisting of magnesium ion compound, a lanthanide ion compound, and a combination thereof; a compound having an —SH group with a $PK_a$ in the range of 0.2 to 13; a sulfide ion compound; and combinations thereof; and
0.1% to 5.0% by weight sodium benzoate.

22. A deicing composition comprising:
an aqueous solution having a pH of between about 8 and about 12, comprising between about 40% and about 75% by weight of an alkali metal carboxylate salt selected from the group consisting of formate, propionate, acetate and lactate; and
at least one corrosion inhibitor comprising a lanthanide ion compound.

23. The composition of claim 22, wherein the lanthanide ion compound comprises cerium acetate hydrate.

24. A deicing composition consisting essentially of:
a carboxylate salt selected from the group consisting of formate, propionate, acetate and lactate;
a lanthanide ion compound; and
tolyltriazole.

25. The deicing composition of claim 24, wherein the carboxylate salt comprises potassium acetate.

26. The deicing composition of claim 24, wherein the lanthanide ion compound comprises lanthanum acetate hydrate.

27. The deicing composition of claim 24, wherein the tolyltriazole is present in a concentration of from 50 ppm to 10,000 ppm.

28. A deicing composition comprising:
a carboxylate salt selected from the group consisting of formate, propionate, acetate and lactate; and
at least one corrosion inhibitor comprising (a) a lanthanide ion compound and (b) a compound having an —SH group with a $pK_a$ in the range of 0.2 to 13.

29. A deicing composition comprising:
an aqueous solution having a pH of between about 8 and about 12, comprising between about 40% and about 75% by weight of an alkali metal carboxylate salt selected from the group consisting of formate, propionate, acetate and lactate; and
at least one corrosion inhibitor comprising a compound selected from the group consisting of 2-mercaptothiazoline; 2-mercaptopyridine; 2-mercaptopyrimidine; 5-mercapto-1-tetrazoleacetic acid; 2-mercaptobenzimidazole; thiolactic acid; 6-mercaptopurine; 1H-1,2,4-triazole-3-thiol; 2-mercaptobenzothiazole; mercaptobenzimidazole; monomecaptotriazine; dimercaptotriazine; trimercaptotriazine; the trisodium salt of trimercaptotriazine; O-ethylxanthic acid; dimethyldithiocarbamic acid; diethyldithiocarbamic acid; trithiocarbonic acid; and hydropolysulfide,carbonylthioylbis, disodium salt (Thio-Red).

30. A deicing composition comprising:
an aqueous solution having a pH of between about 8 and about 12, comprising between about 40% and about 75% by weight of an alkali metal carboxylate salt selected from the group consisting of formate, propionate, acetate and lactate; and
at least one corrosion inhibitor comprising a compound selected from salts of the group consisting of 2-mercaptothiazoline; 2-mercaptopyridine; 2-mercaptopyrimidine; 5-mercapto-1-tetrazoleacetic acid; 2-mercaptobenzimidazole; thiolactic acid; 6-mercaptopurine; 1H-1,2,4-triazole-3-thiol; 2-mercaptobenzothiazole; mercaptobenzimidazole; trimercaptotriazine; the trisodium salt of trimercaptotriazine; O-ethyixanthic acid; dimethyldithiocarbamic acid; diethyldithiocarbamic acid; trithiocarbonic acid; and hydropolysulfide, carbonylthioylbis, disodium salt (Thio-Red).

* * * * *